Jan. 17, 1933.　　　C. G. BRUNTSCH　　　1,894,531
FRUIT BOX LINER
Filed March 7, 1930
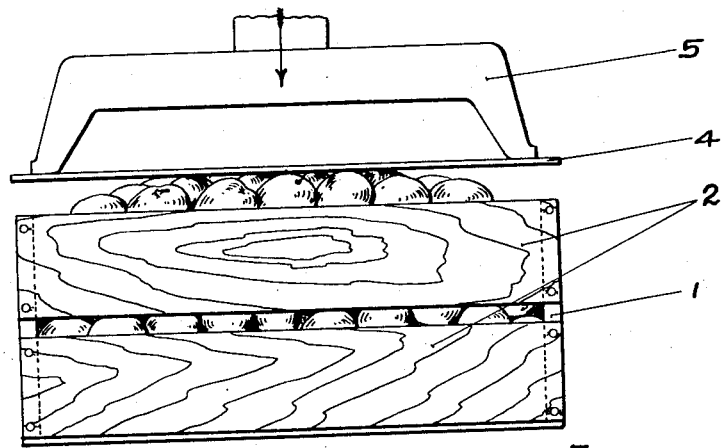
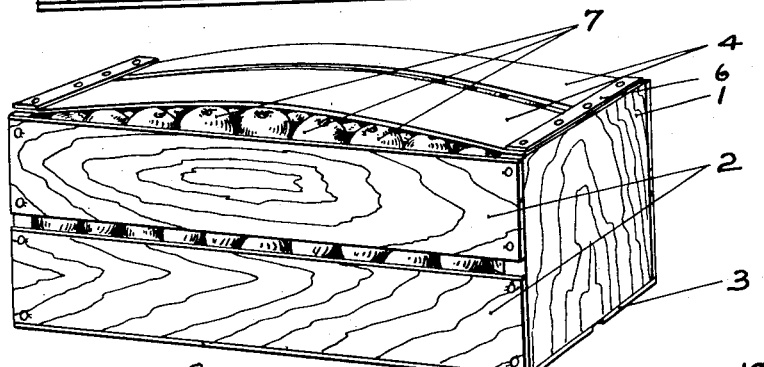
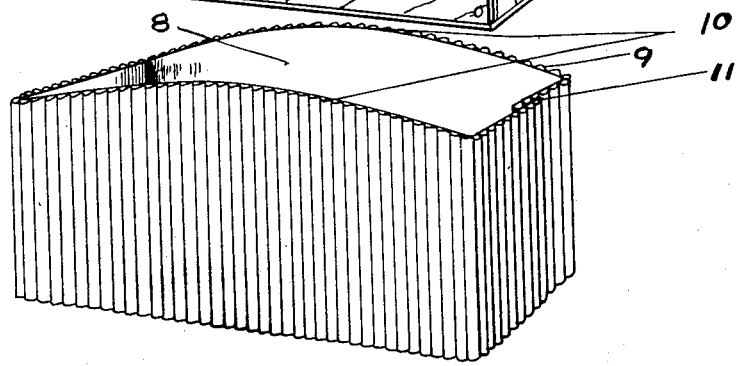
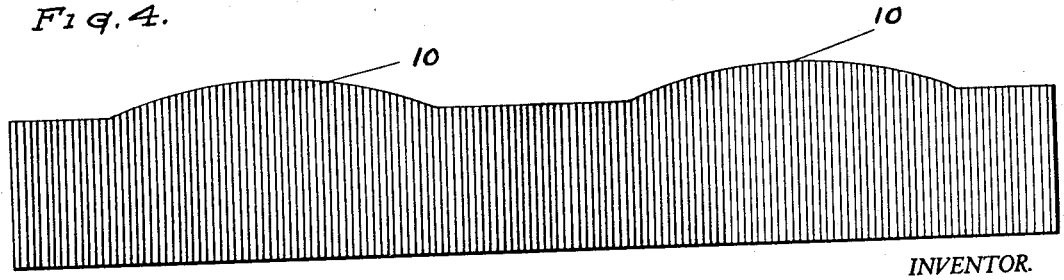
INVENTOR.
CARL G. BRUNTSCH
BY Miller Boykin & Bried
ATTORNEYS.

Patented Jan. 17, 1933

1,894,531

UNITED STATES PATENT OFFICE

CARL G. BRUNTSCH, OF PORTLAND, OREGON, ASSIGNOR TO SCHMIDT LITHOGRAPH COMPANY, OF SAN FRANCISCO, CALIFORNIA, A CORPORATION OF CALIFORNIA

FRUIT BOX LINER

Application filed March 7, 1930. Serial No. 433,979.

This invention relates to the packing of fresh fruit in wooden boxes and has for its objects the provision of a special paper or cardboard liner for protecting the fruit from injury both from the effects of the sharp corners of the boards as well as from abrasions caused by external objects.

In the drawing accompanying this application Fig. 1 is an elevation showing a wooden fruit box filled with fruit and lid being compressed in place.

Fig. 2 is a perspective view of an ordinary fruit box as packed ready for shipment.

Fig. 3 is a perspective view of my special liner made of corrugated paper stock and folded into the form it would occupy if in a box as shown in Fig. 2.

Fig. 4 is a reduced size plan view of the special liner in flattened out or unfolded position.

The ordinary wooden fruit box comprises heavy end pieces 1 to which are nailed lighter side pieces 2, bottom pieces 3, and top pieces 4.

In packing such boxes for distant shipment the fruit is heaped up in the center above the sides of the box and the cover boards 4 are forced down with a press 5 to tightly compress the fruit in place, and after which the ends of the cover are nailed to the end pieces, usually with the aid of cleats 6 as there is considerable tension on the boards when the fruit is first packed and the center of the cover boards arches up to a considerable extent as shown in Fig. 2.

This method of packing is necessary to care for the inevitable shrinkage and settling which takes place by the time the fruit is sold, but if not practiced the fruit would be badly bruised in being shaken in transit.

However, the method of packing itself gives rise to considerable injury to the fruit from pressure against the boards, particularly the upper edges of the side and end boards 2, and also from impact with extraneous objects in the arched area where the fruit 7 is exposed.

To overcome injury paper liners for the box of various kinds have been devised, but thus far no liner has appeared which is universally acceptable to the trade or which will care for the exposed arched area alluded to and at the same time not interfere with the regular method of packing the fruit as above described.

My special liner shown in Fig. 3 overcomes the objections to prior paper liners, protects the fruit on all vertical sides of the box including the arched space and does not interfere with forcing the cover down at the ends as explained.

The liner comprises a smooth sheet 8 of heavy paper stock to one side of which is pasted a corrugated sheet 9 of similar stock and blanked out to elongated form as shown in Fig. 4 with the corrugations extending transversely of the sheet.

The blank is formed with two arched portions 10 so spaced that when the liner is folded to fit within the box these arched portions will be in correct positions to cover the arched areas of exposed fruit 7 and the ends of the liner will overlap slightly at one end of the box as shown at 11.

This liner is placed in the empty box with the fluted side outward so the ribs will not mark the fruit, a plain liner is placed on the bottom of the box, the box is filled, a plain liner placed on top of the fruit, the cover is forced down as described, and due to the liner walls being arched downwardly at the ends there is no interference with the cover or tendency to crumple the liner inwardly with consequent injury to the fruit.

As the bottom of the box rests upon a flat surface during the compression of the fruit therein, and the weight of the box is always upon it, there is not much tendency to bulge the lower side and I therefore cut the lower edge of the liner in a straight line as shown in Fig. 3.

Having thus described my improved liner and its mode of use, I claim:

1. A liner for an oblong wooden fruit box comprising sheet material of paper stock adapted to extend around the inner sides and both ends of the fruit box formed with portions at opposite long sides of the box outwardly arched to conform substantially to the bulged cover of the box when the box is packed and end portions of reduced height whereby to permit forcing down of the cover boards in packing.

2. A liner for a wooden fruit box comprising an elongated piece of paper stock adapted to extend around the inner sides and both ends of the fruit box formed with spaced portions arched on the upper edge to conform substantially to the bulged cover of the box when the box is packed and the lower edge of the liner being substantially straight.

3. A lining for a rectangular fruit box, comprising a sheet of paper material adapted to lie against the inner side wall of the box and arched outwardly beyond the edge of said wall in a manner so as to substantially conform to the arch of the bulged cover of the box when packed.

CARL G. BRUNTSCH.